Patented Jan. 13, 1925.

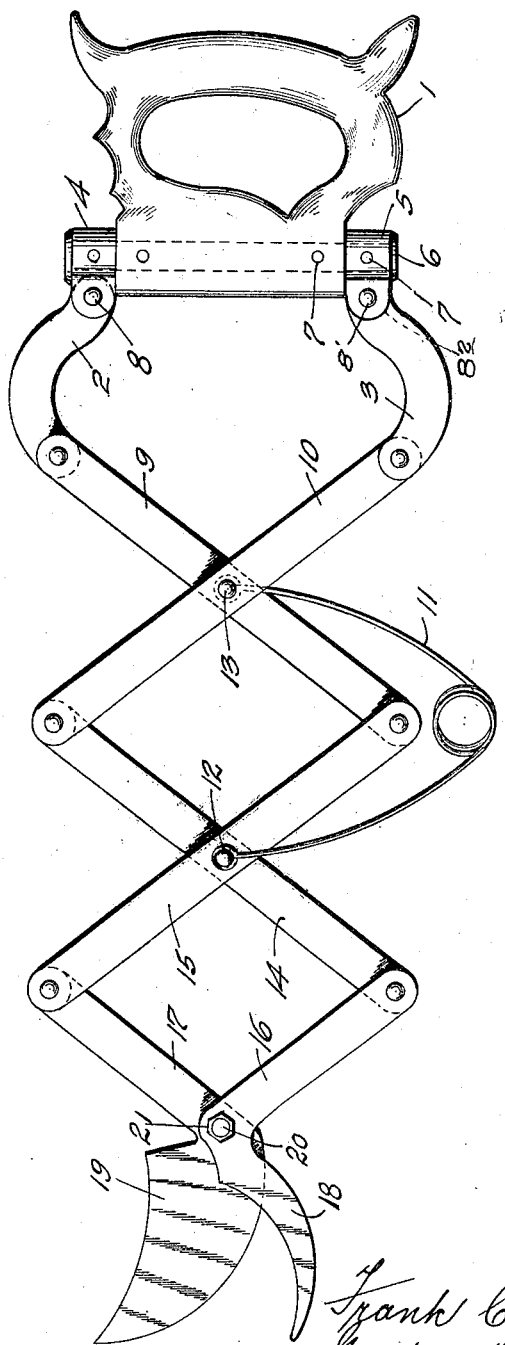

1,522,950

UNITED STATES PATENT OFFICE.

FRANK C. EVANS AND GORDON L. TEALL, OF HIAWATHA, KANSAS.

SHEARS.

Application filed October 31, 1923. Serial No. 671,986.

*To all whom it may concern:*

Be it known that we, FRANK C. EVANS and GORDON L. TEALL, citizens of the United States of America, and residents of Hiawatha, in the county of Brown and State of Kansas, have invented certain new and useful Improvements in Shears, of which the following is a specification.

This invention relates to pruning shears, and particularly to shears having an extensible operating means in which the knife and jaw are moved into cutting positions by pressure on a handle having movement toward and away from the said jaw and blade.

It is an object of this invention to produce pruning shears in which the cutting members are at a comparatively great distance from the handle in order that operations may be carried on while pruning a tree, covering a much wider range than is possible with the employment of the ordinary pruning shears or knives having pivoted handles that are usually operated by pressure of the thumb and fingers of the user.

It is further more an object of the invention to produce a device which can be used close to or remote from the operator, the said device operating with the same degree of efficiency, regardless of the distance of the wood to be cut, from the operator, within predetermined bounds.

It is a further object of this invention to produce pruning shears of the character indicated in which the knives or cutters will be held extended with respect to the handle, the said handle being advanced toward the cutters when the cutting elements have been placed against the limb or vegetation that is to be cut.

With the foregoing and other objects in view, the invention consists in the details of construction, and in the arrangement and combination of parts to be hereinafter more fully set forth and claimed.

In describing the invention in detail, reference will be had to the accompanying drawing in which one embodiment of the invention is illustrated by a view in side elevation.

In these drawings 1 denotes a handle which may be similar to that of an ordinary saw handle in order that it may be firmly grasped by an operator, and the same is connected to the links and arms 2 and 3 respectively, through means of the clips 4 and 5 that are applied to a pin 6 anchored to the handle or extended through a portion thereof. Fastenings 7 such as rivets may be employed for rigidly connecting the handle, pin and clips The link 2 is mounted on a pivot such as 8 carried by the clip 4, and the said link 2 is pivotally connected to the lever 9 of a lazy-tongs which may be of any appropriate size to suit requirements of use, and, of course, may be of such strength as the size of the pruning shears may require. The arm 3 is rigidly connected to the pin 6 by reason of the fact that the clip 5 that is formed as a part of the arm 3 embraces the pin and has an end $8^2$ which overlies the portion of the arm near the pin, the said parts being secured together by a rivet $8^1$. A spring 11 has its ends connected to the pivots 12 and 13 of the lazy-tongs and this spring is operative to elongate or extend the lazy-tongs to its maximum degree. The outer levers 14 and 15 of the lazy-tongs are pivotally connected to the arms 16 and 17 respectively, of the jaw 18 and knife 19 of the pruning shears. The arms 16 and 17 are mounted on a pivot 20 having a nut 21 which can be adjusted to increase or diminish the friction between the arms, or to take up lost motion as wear develops.

It will be obvious from an inspection of the drawing that if the pruning knife is placed so that the wood to be pruned or cut is between the jaw and blade and pressure is applied to the handle, the knife will be operated to sever the wood, whereas when the resistance is removed after the cutting operation, the spring will serve to again extend the lazy-tongs and place the parts in position for a repetition of the operation, so that all that will be necessary for the operator to do is to apply the knife and jaw to the wood to be cut or pruned and then press the handle outwardly to cause the oscillation of the arms 16 and 17, and this will result in the cutting action to which reference has been made.

We claim:

In a pruning shears, a blade and jaw pivotally connected together, a lazy-tongs operative to oscillate the blade and jaw with relation to each other, a handle, a pin secured to the handle, clips on the pin, links pivotally connected to the clips and to the levers of the lazy-tongs, and a spring for normally holding the lazy-tongs extended.

FRANK C. EVANS.
GORDON L. TEALL.